Patented May 22, 1951

2,554,181

UNITED STATES PATENT OFFICE 2,554,181

PROCESS OF VULCANIZING "CHLOROPRENE" RUBBER

Arvel O. Franz, Cartersville, Ga., assignor to Chemical Development Co., Cartersville, Ga., a corporation of Georgia No Drawing. Application April 29, 1947, Serial No. 744,777

11 Claims. (Cl. 260—79.5)

This invention relates to a process of vulcanizing chloroprene polymers popularly called chloroprene or neoprene rubber.

The primary object of the invention is to accomplish vulcanization in a manner which will eliminate the heretofore objectionable scorchiness encountered and at the same time permit increase in speed of production of a vulcanizate having enhanced tensile strength. It is known that chloroprene rubber has its greatest strength when cured in the absence of an accelerator, but for commercial reasons to reduce the curing time, it is necessary that an accelerator be used. The process of the present invention accomplishes the surprising result that, in a matter of minutes, the tensile strength of the vulcanizate is sufficient to meet all commercial purposes, being at least 1600 pounds. I have discovered that cyclohexyl amino cyclohexyl dithiocarbamate and metal salts obtained by reaction of cyclohexylamine, carbon disulfide and a source of metallic ions, e. g., zinc cyclohexyl dithiocarbamate, are effective accelerators for chloroprene rubber. For example, their use permits an increase of 33% in the speed of wire extrusion on a standard wire coating machine and the tensile strength of the coating is 400 pounds higher than has heretofore been obtained. In other words, the use of these accelerators has consistently demonstrated a 10 to 20% increase of tensile strength above those given by standard commercial formulations.

In the use of the process of the present invention, it was observed that the chloroprene rubber developed not only a higher ultimate tensile strength but also developed a higher percentage of its ultimate cure very early in the curing cycle thereby eliminating much of the heretofore encountered rejected and damaged product incident to curing in the conventional manner, as, for example, in the case of the continuous coating of wire.

The art of compounding chloroprene rubbers is not analogous to other natural and synthetic rubbers as was demonstrated by the fact that ultra accelerators for natural, "GRS" and "GRI" (butyl) rubbers are only softeners and retarders when tried for curing chloroprene rubber.

While I have mentioned cyclohexyl amino cyclohexyl dithiocarbamate as the preferred accelerator, it is to be understood that other dithiocarbamates may be employed such as the reaction products of $CS_2$ with amines having the general formula

where $R^1$, $R^2$ are joined to form a cycloalkyl ring or where $R^1$ is aliphatic or hydrogen and $R^2$ is cyclic.

Examples of suitable amines are:

Cyclopropylamine
Cyclobutylamine
Cyclopentylamine
Cycloheptylamine;

and any of the methyl cyclohexylamines such as 2 methyl cyclohexylamine; having the general formula

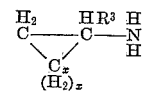

where $R^3$ is aliphatic or hydrogen and $x$ is an integer from 1 to 5, and primary amines in which the amino nitrogen is attached through one aliphatic carbon atom to a cyclo alkyl ring such as Hexahydro benzylamine
Hexahydrobenzyl alpha methyl amine having the general formula

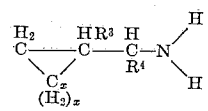

where $R^3$ and $R^4$ are aliphatic or hydrogen and $x$ is an integer from 1 to 5, and primary amines in which the amino nitrogen is attached through one aliphatic carbon atom to an aromatic ring such as Benzylamine
Methyl benzylamine
Alpha phenyl ethyl amine having the general formula

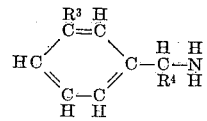

where $R^3$ and $R^4$ are aliphatic or hydrogen.

In such reactions to form the amine salt, 1 mol of $CS_2$ is used with 2 mols of the amine.

The dithiocarbamates of the above-indicated amines may be prepared by reacting the appropriate amine with carbon disulfide in a chlorinated hydrocarbon such as carbon tetrachloride or in a hydrocarbon solvent such as benzene or normal hexane, at temperatures ranging between 0° C. and the boiling point of carbon disulfide.

These reaction products are dithiocarbamates of the amine used.

Also, while I have specifically referred to the zinc salt, it is to be understood that in addition, copper and iron salts and salts of the alkali and alkali earth metals may also be employed such as sodium, potassium, calcium and magnesium. In preparing the metal salts, any of the amines above-mentioned may be reacted with CS₂ and the particular metal compound.

It is preferable to use between .3 and 1.5 parts of the accelerator for each 100 parts of the chloroprene rubber.

All of the reaction product accelerators have the general formula

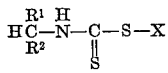

wherein $R^1$ and $R^2$ are in accordance with the above definition and X is a metal or an organic base.

The structural formula of cyclohexyl amino cyclohexyl dithiocarbamate is:

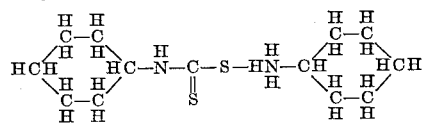

The structural formula of the metal salts of dithiocarbamic acid, e. g., the zinc salt of cyclohexyl dithiocarbamic acid is:

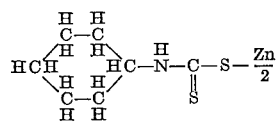

To form the metal salts 1 mol CS₂ is reacted with 1 mol of amine and 1 equivalent of metal oxide, hydroxide or salt, e. g., ½ mol ZnO or 1 mol NaOH, or ½ mol Zn(NO₃)₂.

The soluble salts such as the alkali metal and alkali earth metal salts are peculiarly suited for the acceleration of cure of chloroprene latices and foams while the insoluble salts are particularly suitable for use in milled chloroprene stocks but are not necessarily limited to such use.

*Example I*

| | Parts by weight |
|---|---|
| Gr–M–10 | 100 |
| MgO (L. C.) | 4 |
| Zinc oxide | 1 |
| Cyclohexyl amino cyclohexyl dithiocarbamate | 1 |

*Example II*

| | Parts by weight |
|---|---|
| GR–M–10 | 100 |
| MgO (L. C.) | 4 |
| Stearic acid | .5 |
| Zinc oxide | 1 |
| Zinc cyclohexyl dithiocarbamate | 1 |

In the foregoing examples, the vulcanization reached optimum physical properties in from 5 to 15 minutes at 287° F. and showed no cure in 15 minutes at 230° F., whereas mixes which did not contain the accelerators of this invention did not reach the maximum properties in 60 minutes.

GR–M–10 is polymerized chloroprene which contains approximately 2.0–2.5% of chemical compounds of the thiuram type, or reaction products thereof, which may affect the rate of vulcanization of natural rubber or GR–S compounds if admixed with or cured adjacent to GR–M–10 compounds, and which, in addition, contains a discoloring antioxidant.

The amine salt accelerator exerted a marked softening effect upon the chloroprene rubber whereby it was unnecessary to include a conventional and customary softener in the rubber mix.

I claim:

1. The process of vulcanizing rubbery chloroprene polymers which comprises including in a vulcanizable mix a dithiocarbamate which is the reaction product of an amine having the general formula

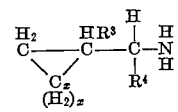

where $R_3$ and $R_4$ are aliphatic and $x$ is an integer from 1 to 5, with carbon disulfide, said dithiocarbamate having the general formula

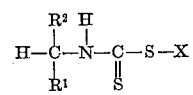

where $R^1$ is an aliphatic ring of 3 to 7 carbon atoms and $R^2$ is an aliphatic radical and X is a metal.

2. The process of vulcanizing rubbery chloroprene polymers which comprises including in a vulcanizable mix a dithiocarbamate which is the reaction product of an amine having the general formula

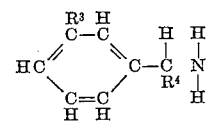

where $R^3$ and $R^4$ are aliphatic, with carbon disulfide, said dithiocarbamate having the general formula

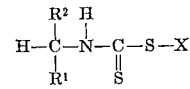

wherein $R^1$ is a benzene ring and $R^2$ is aliphatic and X is a metal.

3. The process of claim 9 wherein the dithiocarbamate is included in amount of from .3 to 1.5 parts per 100 parts of polymer.

4. The process of claim 9 wherein the dithiocarbamate is cyclohexyl amino cyclohexyl dithiocarbamate.

5. The process of claim 9 wherein the dithiocarbamate is a metal salt of cyclohexyl dithiocarbamate.

6. The process of claim 9 wherein the dithiocarbamate is a zinc salt of cyclohexyl dithiocarbamate.

7. The process of claim 9 wherein the dithiocarbamate is benzyl amino benzyl dithiocarbamate.

8. A vulcanizate prepared by the process of claim 9.

9. The process of vulcanizing rubbery chloroprene polymers which comprises including in a vulcanizable mix a dithiocarbamate having the general formula

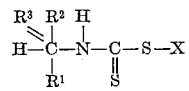

where $R^1$ is a radical selected from the group consisting of aliphatic radicals and hydrogen, $R^2$ is a cyclic radical, and where $R^3$ is a cycloalkyl ring present only in the absence of both $R^1$ and $R^2$, and X is a base selected from the group consisting of metal and organic bases.

10. The process of vulcanizing rubbery chloroprene polymers which comprises including in a vulcanizable mix a dithiocarbamate which is the reaction product of an amine having the general formula

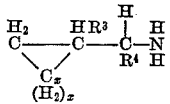

where $R^3$ and $R^4$ are hydrogen and $x$ is an integer from 1 to 5, with carbon disulfide, said dithiocarbamate having the general formula

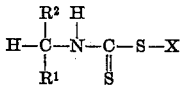

where $R^1$ is an aliphatic ring of 3 to 7 carbon atoms and $R^2$ is an aliphatic radical and X is an organic base.

11. The process of vulcanizing rubbery chloroprene polymers which comprises including in a vulcanizable mix a dithiocarbamate which is the reaction product of an amine having the general formula

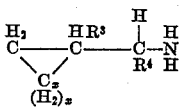

where $R^3$ and $R^4$ are aliphatic and $x$ is an integer from 1 to 5, with carbon disulfide, said dithiocarbamate having the general formula

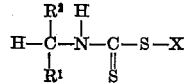

where $R^1$ is an aliphatic ring of 3 to 7 carbon atoms and $R^2$ is an aliphatic radical and X is an organic base.

ARVEL O. FRANZ.

REFERENCES CITED

The following references are of record in the file of this patent:

UNITED STATES PATENTS

| Number | Name | Date |
|---|---|---|
| 1,788,632 | Powers | Jan. 13, 1931 |
| 2,127,375 | Bousquet | Aug. 16, 1938 |
| 2,137,584 | Ott | Nov. 22, 1938 |
| 2,187,719 | Williams | Jan. 23, 1940 |
| 2,214,934 | Ott | Sept. 17, 1940 |
| 2,234,215 | Youker | Mar. 11, 1941 |

OTHER REFERENCES

Reconstruction Finance Corporation, Office of Rubber Reserve "Specifications for Government Synthetic Rubbers," page 19, Jan. 1, 1947. Washington, D. C.